(12) United States Patent
Alexander

(10) Patent No.: US 6,240,787 B1
(45) Date of Patent: Jun. 5, 2001

(54) METHOD OF DETERMINING FLUID INFLOW RATES

(76) Inventor: Lloyd G. Alexander, 1319 Klondike Avenue S.W., Calgary, Alberta (CA), T2V 2L9

(*) Notice: Subject to any disclaimer, the term of this patent is extended or adjusted under 35 U.S.C. 154(b) by 0 days.

(21) Appl. No.: 09/267,808

(22) Filed: Mar. 12, 1999

(30) Foreign Application Priority Data

Mar. 12, 1998 (CA) .................................................. 2231947

(51) Int. Cl.[7] .............................. G01F 1/38; E21B 47/10
(52) U.S. Cl. .................................... 73/861.49; 73/152.18; 73/152.22
(58) Field of Search .......................... 73/861.49, 152.18, 73/152.21, 152.22, 152.29

(56) References Cited

U.S. PATENT DOCUMENTS 4,123,937  11/1978  Alexander ............................. 73/155

*Primary Examiner*—Harshad Patel

(74) *Attorney, Agent, or Firm*—Sheridan Ross P.C.

(57) ABSTRACT

A method is provided for determining the actual inflow rates of gas and liquid into a wellbore from a reservoir. The wellhead is first closed and the wellhead pressure is measured over time. For a briefly period, gas is flowed from the wellhead and the wellhead pressure is measured again. Using the two conditions, the original wellbore gas volume and an original fluid inflow rate is determined. Gas is again flowed from the wellhead, both the flow and the pressure being measured, but this time for a prolonged duration, sufficient to affect the reservoir. Assuming original gas inflow rate and original gas volume remain unchanged during the prolonged flow, a total rate of fluid inflow from the reservoir is determined, and finally an incremental inflow rate of fluid from the reservoir is calculated as being the difference between the total rate of fluid inflow less the original rate of gas flow. If the well is a gas well, the incremental fluid inflow is the actual gas inflow rate. If the fluid inflow is known to be liquid, then an incremental change in volume is equivalent to the liquid inflow rate. Using an exponential relationship for the pressure change during wellhead flow, a theoretical curve pressure response curve can be created, displayed and compared against the actual pressure response, any deviation therebetween being indicative of fluid inflow from the reservoir.

15 Claims, 7 Drawing Sheets

METHOD OF DETERMINING FLUID INFLOW RATES

FIELD OF THE INVENTION

A method is provided including introducing a pressure transient into a reservoir for observing and quantifying the reservoir response, specifically, quantifying the inflow of fluid into the wellbore from the reservoir.

BACKGROUND OF THE INVENTION

In the prior art, it is known to perform build-up and draw-down tests to evaluate the condition of the near wellbore area of a reservoir and the inflow rates of the well. These tests can consume from days to weeks to perform. The pressure is either built up (i.e. Homer plot) or permitted to fall off. The pressure response is analyzed at the tail end of the test, as it approaches steady state.

In the drill-stem test, still used regularly in the industry today, gas is vented from the wellhead through an orifice and the flow rate is measured. The measured flow rate out of the wellhead is presumed to be directly attributable to the flow into the well from the reservoir. Unfortunately, one cannot know the inflow rate based on the outflow alone. If a larger orifice is chosen, the observed rate will be misleadingly higher. If the orifice is smaller, the observed rate can be misleadingly and pessimistically lower. These results are dependent not upon the reservoir performance but instead on the throughput of the orifice at the observed surface pressure. In the most obvious case of misinformation, if the observed pressure is changing while venting then the measured outflow cannot equal the inflow. Even more difficult to assess is for the case of gas-free liquid entering the well where substantially only liquid-displaced gas will be measured as outflow.

In related prior art, known as closed-chamber testing, particular characteristics of a well can be determined without prolonged discharge from the well, as disclosed in U.S. Pat. No. 4,123,937 issued to the applicant. This reference discloses a method of determining annular gas rates and gas volume in the well annulus by measuring the change in pressure during blocked flow and briefly flowing a measured amount of gas from the well. Depending upon and assuming a linear rate of change of pressure, gas flow is calculated as a function of the ratio of the gas flow to the rate of pressure change using mass balance techniques. This prior art method of alternately blocking and permitting annular flow is applied to pumping wells as a means for determining the annulus gas rate without causing a significant change in the bottom hole pressure (usually less than about 10 kPa). With little change in the bottom-hole pressure, the reservoir response is not affected.

In U.S. Pat. No. 4,123,937, the pressure during the flow of gas from the well's annulus is observed. This rate of pressure decline during gas flow is assumed to be linear. Due to the short test duration and lack of reservoir involvement, the approximation is usually sufficient.

As described in the prior art, for any gas-filled space, a general equation for the behavior of gases, which will be familiar to those skilled in the art, can be derived, which has many applications within the oil and gas industry, one of which is the subject of the method according to the present invention.

Generally, nomenclature used is as follows:

M=molecular weight of gas
W=mass of the gas (kg)
P=pressure (kPa abs.)
$Q_1$ or $Q_{in}$=gas flowrate into a system (m³/d)
$Q_2$ or $Q_{out}$=gas flowrate out of a system (m³/d)
T=temperature (deg. K)
V=original gas volume of system, before testing (m³)
n=the number of moles
R=the universal gas constant
z=gas deviation factor
dP/dt=rate of change of pressure (kPa/min)
dV/dt=rate of change of volume (m³/min)
F=Prover (orifice) plate coefficient.
G=Gas gravity
Subscript sc=standard conditions Simply, PV=nRTz and by replacing the number of moles n, with the weight of the gas divided by the molecular weight of the gas, the equation can then be rewritten as $$PV = nRTz \text{ or } W = \frac{PVM}{RTz}$$

where W is the mass of the gas in the system in kilograms.

Similarly, the density of the gas in kg/m³ can be written as $$\frac{W}{V} = \frac{PM}{RTz}.$$

The mass rate in or out is equivalent to the flow rate of gas in standard m³/min multiplied by the density in kg/m³. Mathematically, this mass rate is expressed as $$\text{Mass}_{in} = Q_1 \frac{P_{sc}M}{RT_{sc}}$$

and similarly $$\text{Mass}_{out} = Q_2 \frac{P_{sc}M}{RT_{sc}}$$

where $Q_1$ and $Q_2$ are defined as the gas flowrate in and out of the wellbore respectively.

In order to have a mass balance the rate of change of mass in the system must be equal to the difference between the mass rate in and the mass rate out. Mathematically, this rate of change is expressed as the change in mass in the system over time=mass rate in−mass rate out, or $$\frac{d\left(\frac{P_{sc}M}{RT_{sc}}\right)}{dt} = Q_1 \frac{P_{sc}M}{RT_{sc}} - Q_2 \frac{P_{sc}M}{RT_{sc}}.$$

If we assume that T and z are constant, then this equation can then be differentiated as follows $$M\frac{\left(V\frac{dP}{dt} + P\frac{dV}{dt}\right)}{RTz} = M\frac{P_{sc}(Q_1 - Q_2)}{RT_{sc}} \text{ or}$$

$$Q_1 - Q_2 = T_{sc}\frac{\left(V\frac{dP}{dt} + P\frac{dV}{dt}\right)}{TzP_{sc}}$$

The units on both sides of the equation are in m³/min. If we express $Q_1$ and $Q_2$ in m³/day then the left side of the equation must be divided by 1440 minutes per day. If $T_{sc}=275.15+15$ degrees Kelvin and $P_{sc}=101.325$ kPa, then the equation can be expressed as:

$$Q_1 - Q_2 = 4095 \frac{\left(V\frac{dP}{dt} + P\frac{dV}{dt}\right)}{Tz} \text{ or } K = \frac{4095}{Tz} \quad (1)$$

$$Q_1 - Q_2 = KV\frac{dP}{dt} + KP\frac{dV}{dt}$$

The above equation (1) therefore can be considered to be the fundamental equation that satisfies the mass balance of a system and can be used as a steppingstone in evaluating oil and gas wells, flowing or pumping. The derivation of this fundamental equation has been previously disclosed in U.S. Pat. No. 4,123,937 and can be used as the starting point in the development of additional processes to support the new method of testing.

SUMMARY OF THE INVENTION

Simply, a method is provided for determining the actual inflow rates of fluids into a wellbore from a reservoir. Moreover, this determination is performed while flowing wellbore gases from the wellhead for a duration sufficient to affect the reservoir and thereby provide representative results.

In the simplest application, in a gas well, the equivalent of a closed chamber test is performed, then the wellbore is blown down for a prolonged period so as to involve the reservoir, the method of the invention providing a direct and actual measure of the gas inflow rate, replacing and correcting the prior art analysis obtained during drill-stem testing In one broad aspect of the invention, a method is provided for determining the inflow of fluid from a reservoir into the wellbore of a well completed into the reservoir. The method broadly comprises the steps of:

(a) blocking the wellhead and measuring wellhead pressure over time;

(b) briefly flowing gas from the wellhead and measuring wellhead pressure over time, the duration of gas flow being insufficient to affect the reservoir;

(c) determining the original wellbore gas volume and an original fluid inflow rate as a function of the change of pressure and the original gas volume assuming all of the fluid inflow from the reservoir is gas and the original gas volume remains constant, preferably using an exponential relationship to determine the change in pressure while the wellhead is flowing; then (d) flowing gas from the wellhead for a prolonged duration, while measuring the wellhead gas flow and measuring the wellhead pressure over time, the duration of gas flow being sufficient to affect the reservoir;

(e) determining the total rate of fluid inflow from the reservoir as a function of the change in pressure in the wellbore, the rate of flow from the wellhead, and the original gas volume assuming the original gas volume remains constant throughout step (d); and finally (f) determining the incremental inflow rate of fluid from the reservoir as being the difference between the total rate of fluid inflow less the original rate of gas flow.

More preferably, if the fluid inflow is known to be gas then the incremental fluid inflow is the actual gas inflow rate. If the fluid inflow is known to be liquid, then the change in gas volume in the wellbore is not constant—that magnitude of the change being the liquid inflow. The incremental change in volume being determined knowing the original gas volume and gas inflow rate, the wellhead flow rate, the instantaneous pressure and the actual incremental change in pressure.

In another preferred application of the method of the invention, a theoretical curve of the system's pressure response can be created and compared against the actual pressure response, any deviation therebetween being indicative of fluid inflow from the reservoir.

DETAILED DESCRIPTION OF THE PREFERRED EMBODIMENT

Figure 1:
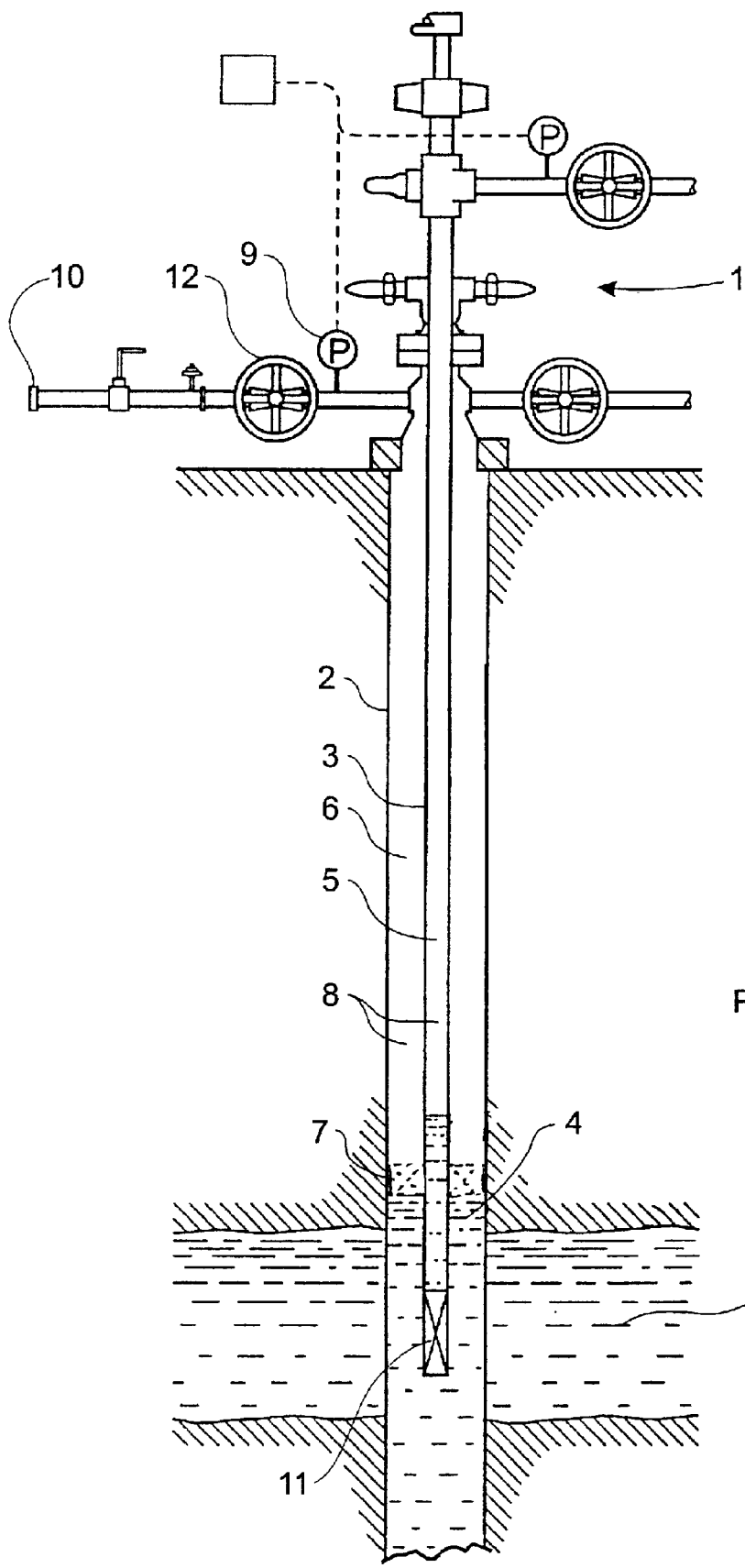
FIG. 1 is a cross-sectional representation of a conventional crude oil or gas well and associated surface equipment or wellhead.

Having reference to FIG. 1, a conventional well is shown comprising a wellhead 1, well casing 2, and a tubing string 3 extending downwardly inside the bore of the casing 2. The casing 2 is perforated adjacent its bottom end 4 for permitting reservoir fluid 5 to flow into the system typically formed of the annulus 6 formed between the casing 2 and the tubing string 3. A packing 7 may or may not be fitted into the annulus 6 and thus the flow of fluid can be up the bore of the tubing string 3, the annulus 6 or both 3,6. Generally then, the system or volume in which fluids may travel up the well to the surface is deemed to form the wellbore 8, usually comprising the annular space 6 and tubing string 3.

A pressure transducer 9 monitors and records the pressure in the wellbore 8. A pump 11 is often fitted to the bottom of the tubing string 3.

As disclosed in U.S. Pat. No. 4,123,937, the method of calculating wellbore gas volume V and flow rate ($Q_1$) comprises measuring the change in wellbore pressure over time for two sets of flow conditions; one set while temporarily blocking flow from annulus, and a second set while briefly flowing and measuring the rate of gas from the wellbore. Means for measuring gas rates include a flow measurement device such as a critical flow prover 10 to a port on the wellhead 1. The prover 10 comprises a vent plate having a vent orifice of predetermined calibrated size mounted to a valve port 12 used to selectively open and close the gas path between the wellhead and the prover 10.

Figure 2:
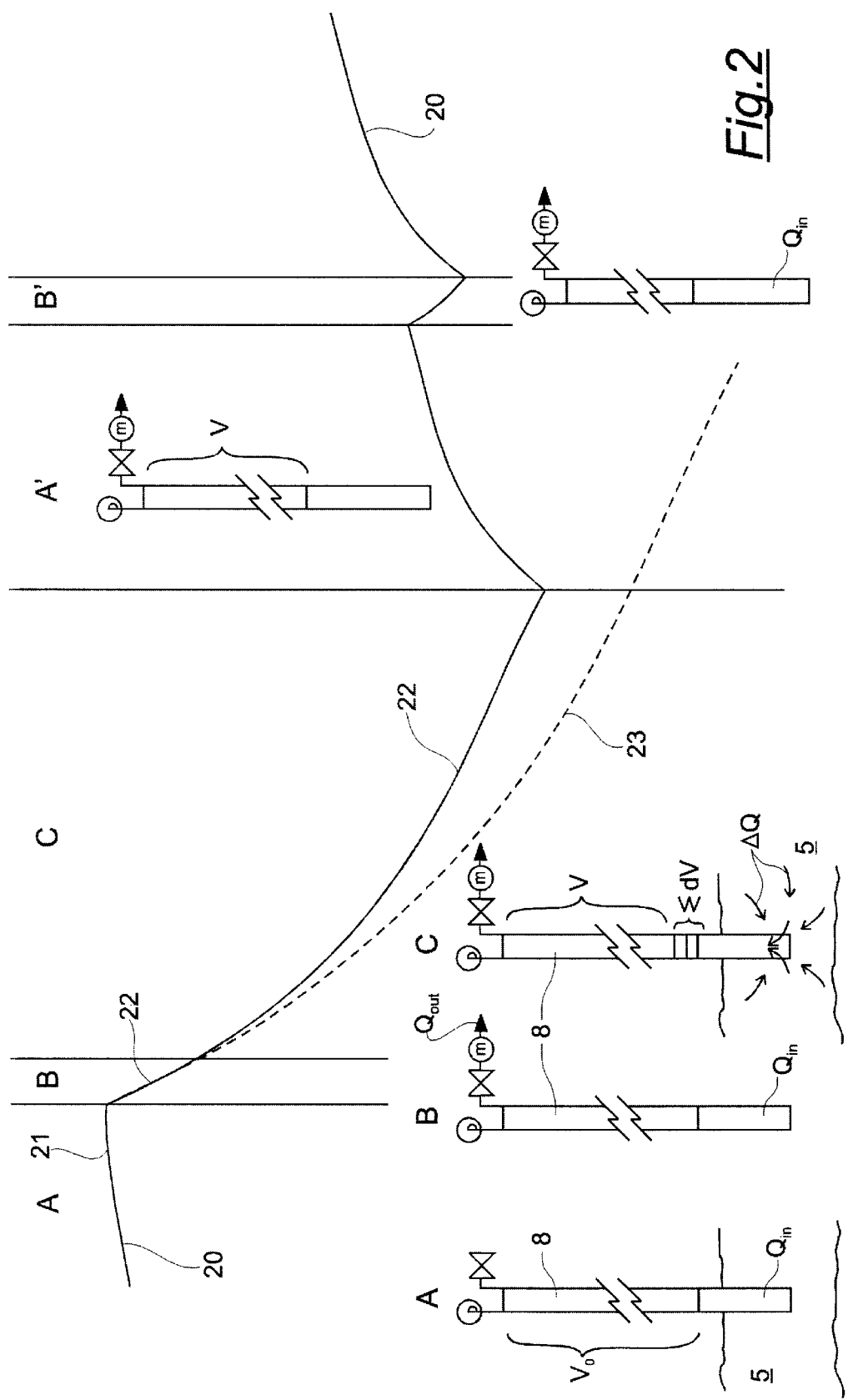
FIG. 2 is schematic representation of the wellbore at various steps of the preferred embodiment of the invention and the associated pressure response.

Having reference to FIG. 2, a schematic representation of the new method is illustrated. Various schematic states of the wellbore are displayed as they correspond to the dP/dt pressure response 20.

In a first embodiment, steps A, B and C are performed to establish measures of the rate of fluid flow in the wellbore 8. Typically, upon drawdown, this would be the fluid flow from the reservoir 5 into the wellbore 8 (see FIG. 1).

Determination of Fluid Flow Rate—Step A

More specifically, step A is similar to the first part of the prior art closed chamber test wherein the operator blocks flow at the wellhead 1 and measures the surface pressure 9 and its rate of change. The pressure response 21 is linear. The change in pressure indicates that something is entering or leaving the wellbore ($Q_{in}$).

Assuming $Q_{in}$ is only due to gas flow, then the volume of gas in the wellbore $V_o$ must remain constant and thus $$\frac{dV}{dt} = 0.$$

While the prover is closed 10, $Q_{out}$ is zero and fundamental equation (1) derived above becomes:

$$Q_{in} = KV \frac{dP}{dt}\bigg|_{closed} \quad (2)$$

where $\frac{dP}{dt}\bigg|_{closed}$ is the change in pressure evaluated when the prover is closed and both V and $Q_{in}$ remain unknown.

Step B

Then for B, the pressure response 22 is changed. This is typically performed by venting gas in the wellbore 8 through the critical flow prover 10. The prover 10 has a known plate size and the pressure differential across the wellhead 1 for the wellbore 8 must be sufficient to achieve critical flow through the prover. Alternatively, if the pressure in the well is too low, nitrogen is progressively injected through the prover 10 to increase the pressure.

Initially and throughout the short duration of B, pressure at the wellhead 1 changes but the pressure change is not immediately apparent at the reservoir 5. Flow of fluid at the reservoir 5 is not affected. Thus, it can be assumed that $Q_{in}$ at A is the same for $Q_{in}$ at B and $V_o$ does not change. The net fluid inflow is then described as:

$$Q_{in} - Q_{out} = KV_o \frac{dP}{dt}\bigg|_{open} \quad (3)$$

where $Q_{out}$ is measured, $$\frac{dP}{dt}\bigg|_{open}$$

is the change in pressure evaluated when the prover is open and both $V_o$ and $Q_{in}$ remain unknown.

During the short duration of step B, the prior art has assumed that the response 22 has been linear.

More exactly and as disclosed in the present invention, the pressure response 22 throughout steps B and C is an exponential one. The pressure response 22 can be defined as follows.

Using the prover 10 as the measurement device m, then $$Q_{out} = PF\sqrt{\frac{T_{sc}}{GT_z}}$$

where F is the prover flow coefficient. The prover calculation as a function of pressure can be defined as C so that $Q_{out} = PC$. Again, assuming $dV/dt = 0$ and substituting $Q_{out}$ into equation (4) and rearranging yields:

$$Q_{in} = PC + KV \frac{dP}{dt}\bigg|_{open} \quad (4)$$

Rearranging equation (4) yields the exponential form of the equation as $$dt_{open} = \frac{KV dP_{open}}{Q_{in} - PC}.$$

Integrating both sides with respect to time, between $t_1$ and $t_2$, yielding $$C(t_2 - t_1) = -KV \ln\left(\frac{CP_2 - Q_{in}}{CP_1 - Q_{in}}\right) \quad (5)$$

$Q_{out}$ is measured, where both V and $Q_{in}$ are also unknown.

Simply, now two equations (2) and (5) are known, enabling the solution for the two unknowns, original gas volume V and $Q_{in}$.

Inserting equation (2)

$$Q_{in} = KV \frac{dP}{dt}\bigg|_{closed}$$

into the equation (5) yields:

$$C(t_2 - t_1) = -KV \ln\left(\frac{CP_2 - KV \frac{dP}{dt}\big|_{closed}}{CP_1 - KV \frac{dP}{dt}\big|_{closed}}\right) \quad (6)$$

Equation (6) becomes the working equation for the new method wherein all variables can be solved numerically except for volume V.

Calculation of Initial Gas Volume $V_o$—Steps A and B

Figure 3:
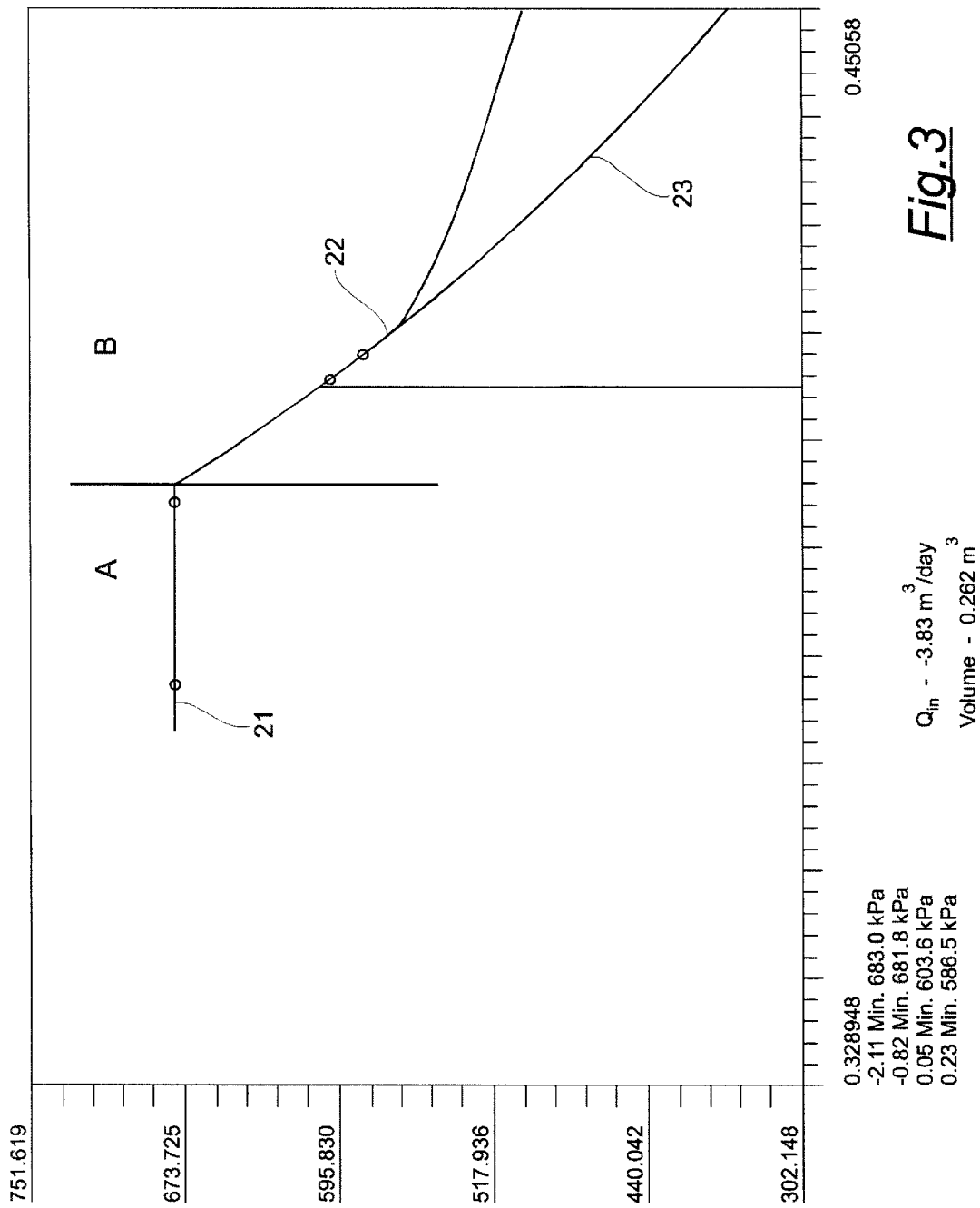
FIG. 3 illustrates steps A and B of the method and identifies the selection of the first and second pairs of pressure values.

Referring to FIGS. 2 and 3, in solving equation (6) for volume $V_o$, four pressure P at time t points are selected. In step A, the first two points are taken during a linear portion of the curve 21, prior to opening the prover 10. This pressure response 21 is defined by equation (2) in which both V and $Q_{in}$ are unknowns.

In step B, the second two $P_1$, $t_1$ and $P_2$, $t_2$ points are taken from response 22 as soon as possible (within seconds) of the prover 10 being opened. The points are selected where the reservoir 5 is not yet involved.

Equation (6) can not be solved directly, but can be solved using numerical iteration, most preferably using an iterative computer program. Using one of many various numerical methods techniques, known to those of ordinary skill in the art, equation (6) can easily be solved for any one of the variables knowing the other variables.

Equation (6) is solved in an iterative process and the value of $V_o$ is calculated. Knowing $V_o$, equation (2) can be solved to obtain the annular gas rate $Q_{in}$.

Theoretical Pressure Response—Visual Indication of Fluid Inflow

In another embodiment, it can be useful for an operator to obtain a qualitative on-site visual indication on the display of a portable computer of the performance or fluid inflow rate of the well. A theoretical pressure response 23 can be illustrated and plotted against the actual pressure response 22. If the actual and theoretical responses 22,23 match then the operator is able to state that there is no additional or incremental fluid inflow ΔQ. If the two responses 22,23 deviate, then there must be an incremental fluid inflow ΔQ.

For determining the theoretical response 23, the known values of $V_o$ and $Q_{in}$ can be inserted into equation (6) for calculating a theoretical pressure response over time $$\left[\frac{dP}{dt}\right]_{Theo}$$

for a system having constant volume V and constant gas inflow $Q_{in}$, vented through a known prover plate 10.

More particularly, from inspection one can see that equation (6) has the general form of $$\ln\left(\frac{a}{b}\right) = d.$$

Rearranging, one can write $a = be^d$, where, applied to equation 6, $a = CP_2 - Q_{in}$, $b = CP_1 - Q_{in}$, and $$d = -\frac{C(t_2 - t_1)}{KV}.$$

Accordingly, equation (6) can be rewritten as $$CP_2 - Q_{in} = (CP_1 - Q_{in})e^{-\frac{C(t_2-t_1)}{KV}} \quad \text{or}$$

$$P_2 = (CP_1 - Q_{in})e^{-\frac{C(t_2-t_1)}{KV}} + \frac{Q_{in}}{C} \quad (7)$$

Equation (7) enables calculation of the surface pressure response $$\left[\frac{dP}{dt}\right]_{Theo}$$

for the theoretical case.

Whether a theoretical response is determined or not, knowing $V_o$ and $Q_{in}$, the actual response of the reservoir fluid inflow rates can be determined from the actual pressure response in step C when the prover is open $$\frac{dP}{dt}_{open} \quad \text{or} \quad \frac{dP}{dt}_{actual}.$$

Step C

As stated, for the first embodiment, the well test is extended into step C, the objective being to markedly change the pressure response 22 so as to affect the reservoir 5 and accentuate changes in fluid flow into or out of the wellbore 8. Thus, in contradistinction to the minimum pressure drop used in the prior art closed chamber test, the duration of the venting period applied in the present invention is prolonged so as to intentionally disturb the reservoir 5. Where the known closed chamber test may typically experience a small 10 kPa pressure change, the deliberately introduced pressure change of the present invention is usually in the order of 80 to 1000 kPa or more. The "prolonged" duration or time required to impart this transient into the reservoir 5 can vary from minutes (for a well with high flow rates) to hours (low flow rates).

In the case where $Q_{out}$ is being released from the wellbore 8 and surface pressure 9 is reducing, the reservoir 5 typically responds with an increased production of fluid (not considering anomolous wellbore phenomenon such as foam formation or collapse). The fluid inflow Q from the reservoir could be liquid, gas or a combination thereof. Over time, in response to the increased inflow, the rate of pressure decrease slows, having an exponential response. Eventually, the rate of pressure change will flatten to a steady state value (not shown). The prior art drawdown test seeks to achieve this steady state value. The method of the present invention does not require the pressure change 22 to achieve steady state.

For the first time, the actual dP/dt response 22 of a conventional well test procedure is converted into values of fluid inflow rates representative of the reservoir's capability.

If the reservoir fluid flow rate is unchanged between steps A and C then equation (2) should balance, $V_o$ and $Q_{in}$ being constant. If equation (2) doesn't balance, the actual and theoretical responses 22,23 will deviate which is easily ascertained by inspection.

Now, while measuring flow at the wellhead 1, the actual pressure response 22 permits determination of a reservoir-wellbore fluid flow rate which is different than determined in step A and B.

Incremental Reservoir Fluid Flow ΔQ

When calculating actual total fluid inflow using $$Q_{tot} = KV \frac{dP}{dt}_{actual}$$

and if $Q_{tot}$ is not equal to $Q_{in}$, then there must be an incremental fluid flow ΔQ as defined by:

$$Q_{tot} = \Delta Q + Q_{in} = Q_{out} + KV_o\left[\frac{dP}{dt}\right]_{Actual} \quad \text{OR} \quad (8)$$

$$\Delta Q = Q_{out} + KV_o\left[\frac{dP}{dt}\right]_{Actual} - Q_{in}$$

Taken alone, equation (8) defines the incremental flow rate ΔQ of fluid.

Basically, three cases arise: ΔQ is all gas, ΔQ is all liquid, ΔQ is gas and liquid.

In the first case, if it is known that the phase of the fluid is all gas then V remains constant and equation (8) can be used directly to calculate the incremental gas inflow rate ΔQ. The overall or total gas inflow rate $Q_{tot}$ from the reservoir would be $Q_{in} + \Delta Q$.

Alternately, in the second and third cases, the inflow ΔQ may include liquid and thus the original gas volume $V_o$ may be changing an incremental amount $$\sum_{t1}^{t2} dV.$$

If $$\frac{dV}{dt}$$

is negative, volume $V_o$ is getting smaller and thus liquid must be entering the system. The magnitude of the liquid flow is the absolute value of the negative gas flow.

For the third case, where all the fluid flow is all liquid, then the original gas volume will change. More particularly, the gas volume will exactly change by the volume of liquid inflow. If one continues to assume that $Q_{in}$ is a constant, and that $$\frac{dV}{dt} \neq 0, \text{ then } Q_{in} - Q_{out} = K(V_{new})\frac{dP}{dt} + KP\frac{dV}{dt}$$

where $V_{new} = V_o + \Sigma dV$. For each increment in time, $$dV = \frac{dV}{dt}dt$$

and when added to the original volume $V_o$ then rearranging gives:

$$\frac{dV}{dt}\bigg|_{liq} = -\frac{dV}{dt}\bigg|_{gas} = -\left(\frac{Q_{in}}{K\overline{P}} - \frac{Q_{out}}{K\overline{P}} - \frac{(V_o + \sum dV)}{P}\frac{dP}{dt}\right) \quad (9)$$

where P is the instantaneous pressure in the wellbore at surface 9 and $\overline{P}$ is the average pressure over dt. In the first instance of an iterative calculation, $V_{new} = V_o$ and every variable is known except $$\frac{dV}{dt}.$$

For each dt slice in time, $$\frac{dV}{dt}$$

can be calculated, dV is calculated, and $V_{new}$ is increased by another increment of dV.

Iteratively, a new incremental volume change $$\sum_{t1}^{t2} dV$$

can be determined where $$V_{new} = V_o + \sum_{t1}^{t2} dV$$

throughout step C.

The gas and liquid-only cases bound the second case wherein the fluid flow comprises both gas and liquid.

Determining Gas And Liquid Phase Fractions

In the second case, where it is unknown whether the fluid is gas, liquid or a mixture of both, more testing is required.

If the volume V in the wellbore can be determined after step C, then the difference between the volume $V_o$ at A and the volume V at the conclusion of step C will be illustrative of the volumetric fraction $V_{liq}$ of the $\Delta Q$ inflow which was liquid. The decrease in gas volume is $V_f = V_o - V$ and the incremental inflow of liquid is $$Q_{liq} = \frac{V_o - V}{t}.$$

Thus, of the incremental inflow $\Delta Q$, and amount $Q_{liq}$ would be liquid and the inflow rate of gas is $Q_{gas} = \Delta Q - Q_{liq}$.

To establish whether the volume of gas V has changed, one of several techniques could be used. After step C, a sonic fluid level could be determined to establish V. This method is unfortunately inaccurate in situations involving foam. Alternately, a bottom hole pressure sensor can employ measures of hydrostatic head to calculate changes in liquid depth and thus gas volume. It is not always feasible to employ bottom hole sensors, such as in pumping wells.

Accordingly, in an extension of the test disclosed above, a repeat of the A and B steps of the test can be performed as steps A' and B'.

Steps A' and B'

In a third embodiment, and as shown in FIG. 2, two additional steps A' and B' can be performed to determine the quality of the fluid as being gas, liquid or a mixture. Similar steps are taken as was described for steps A and B above, more particularly, the prover is closed for step A' and the first two points of the pressure response 22 are selected. Then the prover 10 is opened for step B' and the second two points are selected. Equations (2) and (6) are again solved for the new value of V and $Q_{in}$. The volume V at A' is compared to the volume $V_o$ calculated at A. The incremental liquid inflow $\Delta Q$ is then calculated as stated above.

EXAMPLE I

Figure 4:
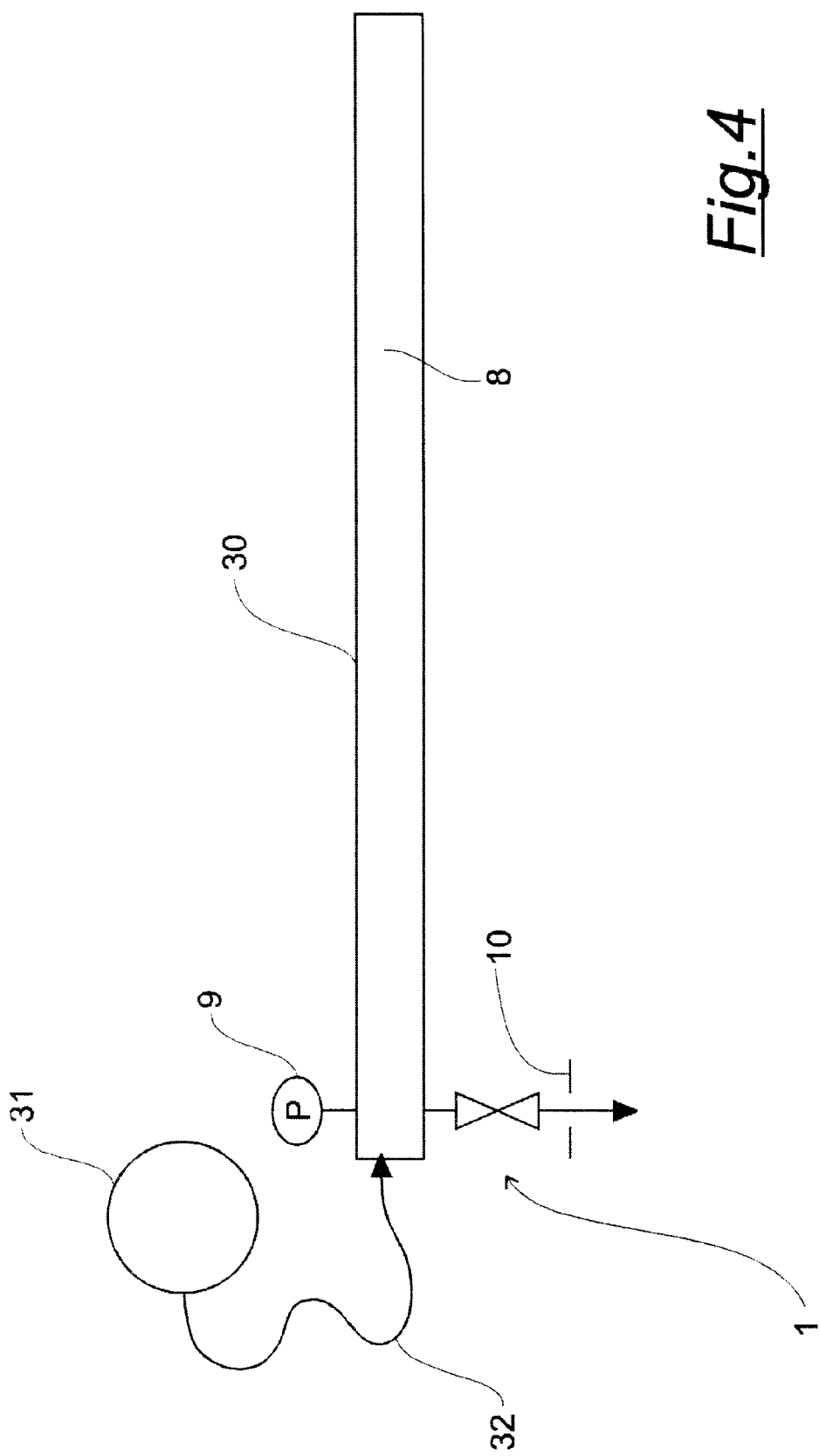
FIG. 4 depicts a schematic of test apparatus used in illustrative Example I.

As shown in FIG. 4, a 149 m long piece of plastic tubing 30 having an internal diameter of 48.4 mm was used to simulate a wellbore 8. The actual volume $V_o$ of the tubing 30 was 0.274 m³. An air compressor 31 was connected by small bore flexible hose 32 to the tubing's bore to simulate $\Delta Q$ gas flow into the wellbore 8. In this particular instance, the tubing 30 had a leak and thus there was a simulated gas outflow $Q_{in}$ of $-3.82$ m³/day. As a flow measurement device, the tubing 30 was fitted with a critical flow prover 10. A recording pressure transducer 9 was also located adjacent the end of the tubing 30 having the prover 10, representing the wellhead 1.

Compressed air was forced into the tubing 30 to simulate about 200 m3/day of incremental gas inflow $\Delta Q$.

Figure 5:
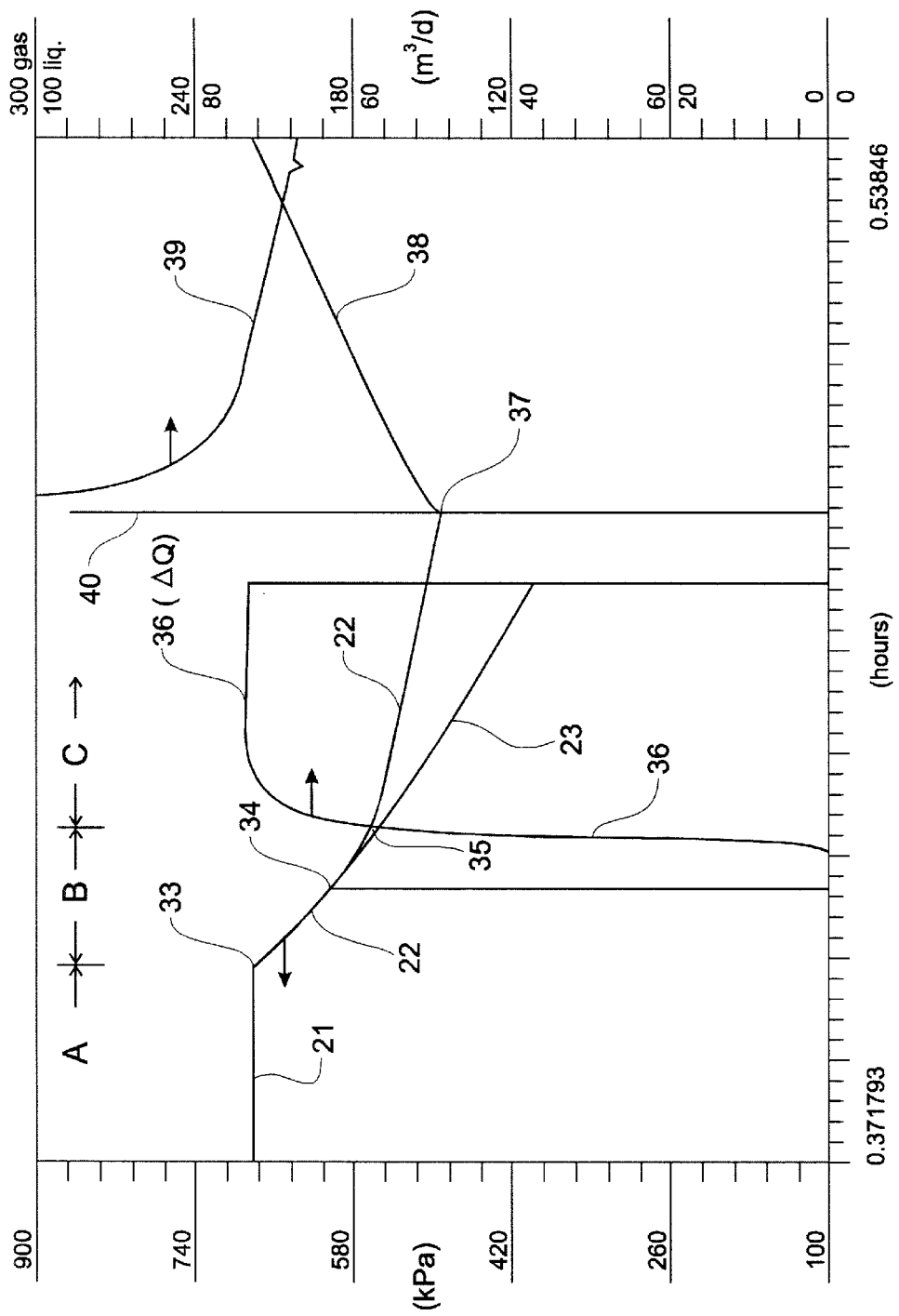
FIG. 5 is a graph illustrating the change in pressure in the test apparatus of FIG. 4 and the calculated fluid inflow rates if the fluid is all gas.

As shown in FIG. 5, initially the tubing 30 was pressurized to about 680 kPa as step A. For steps B and C, the critical flow prover 10 was opened. The prover 10 had a plate factor of 0.59388. Temperature was deemed 273.15.

The prover 10 was opened at 33. Due to physical constraints, it was only at 34 that the recording instruments were activated to record the actual pressure response 22 representative of step B and the start of step C.

As was shown in FIG. 3, four points were selected. Note that according to equations (2) and (6), sufficient information then existed to calculate and draw the theoretical exponential pressure response 23 as if the leak (simulating $Q_{in}$), was the only flow from the tubing throughout step C.

At 35 the compressor was switched on, simulating incremental fluid flow $\Delta Q$ and causing the actual pressure response 22 to deviate from the theoretical curve 23.

Using equation (8), assuming the incremental flow ΔQ is only gas, as it was in the simulated example, then the incremental gas rate ΔQ was calculated and is displayed as curve 36.

Step C was terminated at 37 by closing the prover 10. With the compressor still switched on, the surface pressure 9 again climbed shown as 38. With the prover 10 closed, $Q_{out}=0$, and the simpler closed-chamber testing of the prior art was applied to ascertain the value of V and the fluid flow 39 or $Q_{in}$. Note the close correspondence of the rates 36, 39 calculated by the new method and prior art method respectively. The new method was calculated with flow $Q_{out}$ at the wellhead, and prior art method was calculated with the wellhead blocked. In contradistinction with the prior art, the new method permits calculation of fluid flow rates for a well in which there is significant flow at the wellhead 1, involving the reservoir 5.

Note that a spike 40 appeared in the gas rate calculation. This spike 40 is believed to be an artifact due to the equalization of pressure which took place between the relatively large (0.06 m³) tank of the compressor 31, through 10 meters of small diameter air-line hose 32, and to the tubing 30, when the prover 10 was closed.

Figure 6:
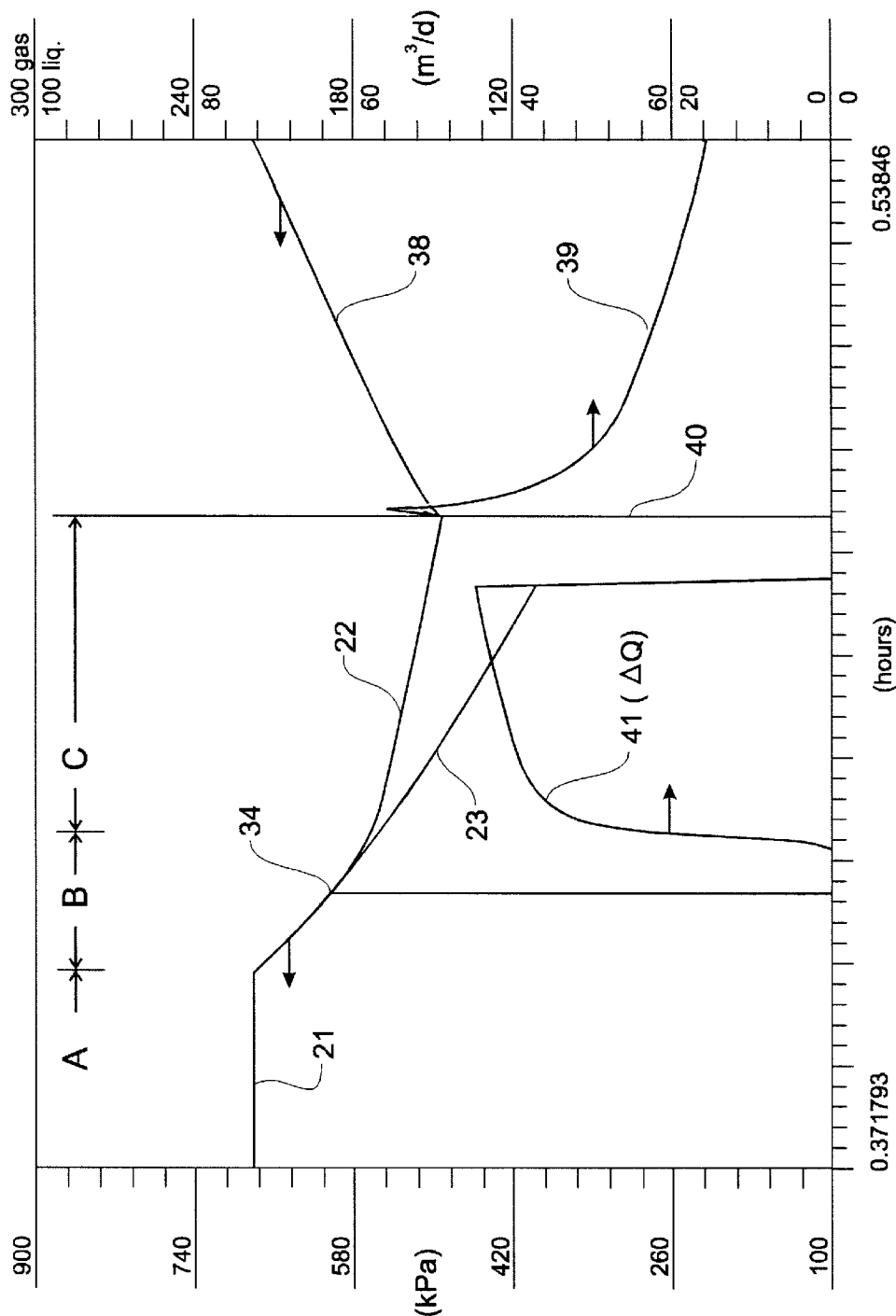
FIG. 6 is a graph illustrating the change in pressure in the test apparatus of FIG. 4 and the calculated fluid inflow rates if the fluid is all liquid.

In FIG. 6, the same test is illustrated, yet the liquid-only equation (9) was used on the pressure response data instead of equation (8), thereby illustrating the calculated liquid rate as if the fluid being introduced to the tubing 30 was liquid rather than compressed air.

EXAMPLE II

Figure 7:
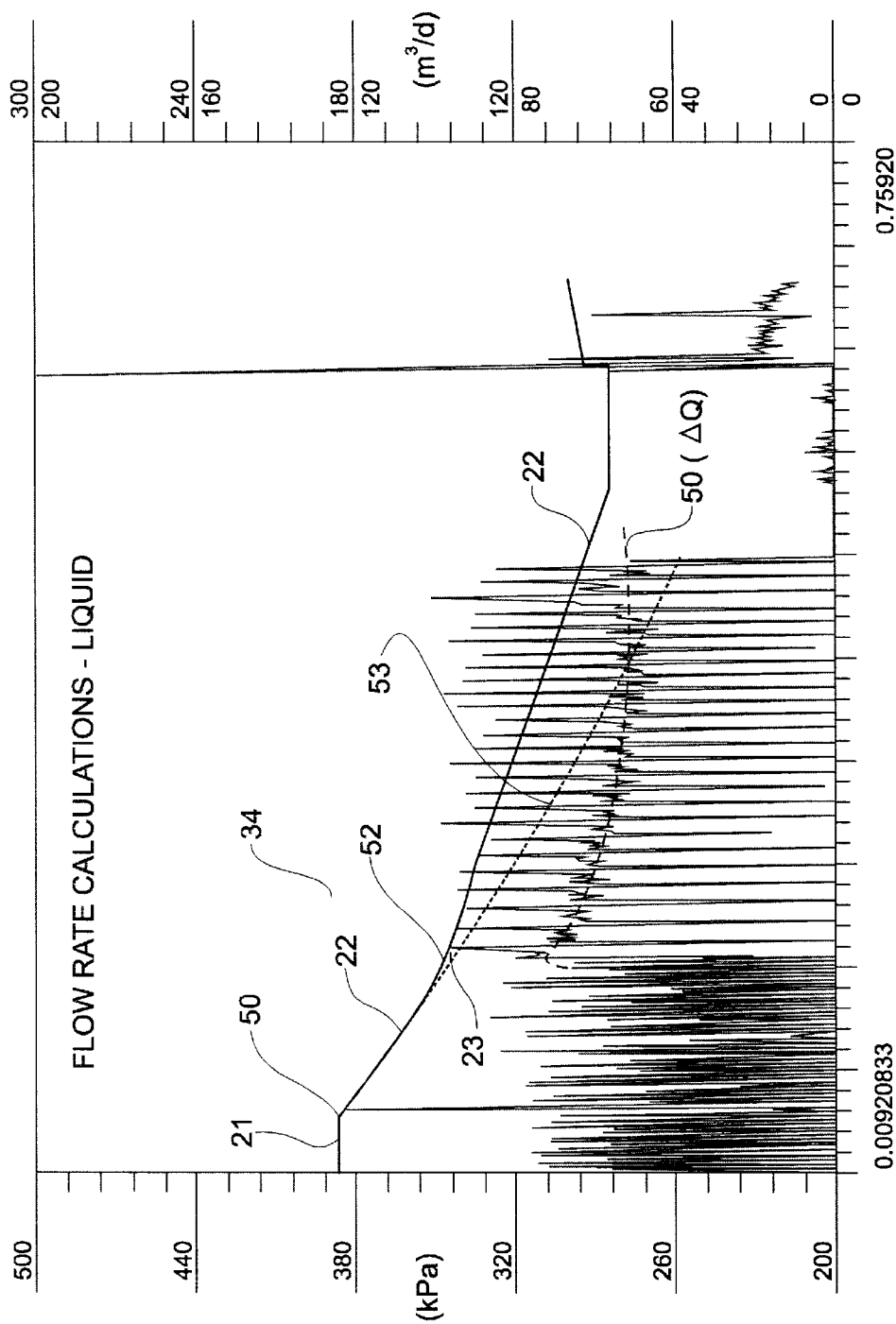
FIG. 7 is a graph illustrating the change in pressure in a pumping oil well of illustrative Example II and the calculated liquid inflow rates.

As shown in FIG. 7, the new method was applied to a known, pumping oil well having a low gas-oil-ratio (GOR). The actual pressure response 22 was very sensitive and should have been electronically filtered but was not. As shown, curve 50 representing fluid flow calculations, which were based upon the pressure response 22, accentuated the pressure swings however the fluid flow rate was distinguishable.

The well had a surface pressure at the wellhead of about 305 kPa. A prover was fitted to the wellhead and was opened at 51. The recording of pressure the response 22 was also obtained immediately.

V and $Q_{in}$ were determined.

For illustrative purposes, a theoretical pressure response is presented as 53.

Equation (9) was applied to the pressure response 22 of this known liquid-only producing well. Incremental liquid inflow rates ΔQ were calculated at about 68.7 m3/day.

Actual average liquid production was measured in the on-site tankage in two instances at about 70.1 and 71.1 m³/day.

The applicability and advantages of the system include:

Investigation of a well is reduced from a conventional duration of days and weeks down to mere minutes or an hour or so;

Quantifying the influx of fluid;

Determining the relative gas and liquid components of fluid influx by combining the novel method with known liquid level sensing methods, or repeating the novel method to obtain follow-up gas volumes;

Applying the exponential decay of the pressure response curve to the known closed chamber testing methodology so as to more accurately determine the initial volume of gas in the system;

Applying the method to a drill stem test under a nitrogen cushion to establish deviation of the pressure response curve from theoretical and determining fluid influx despite operational constraints; and The ability to inspect and compare a theoretical and the actual pressure curve so as to ascertain the reservoir response for fluid inflow. How soon the actual response deviates from theoretical is informative. For reservoirs with a high transmissibility, a delay in the deviation is indicative of localized damage. If it is known that other wells in the same reservoir demonstrate a faster deviation, then the slow deviation wells can be targeted for further investigation.

Some examples of the applicability of the method include:

Pumping oil well: Venting the annulus of a pumping well to evaluate the wellbore gas volume, the annular gas rate and the inflow rate of gas and oil when the pump is deactivated.

Gas well testing: Determining sandface gas inflow rates as a gas well is being produced at surface. The present practice is to report the surface flow rate as though it were equivalent to the downhole sandface inflow rate. This is seldom true. For this reason, reservoir computations utilizing rate data are frequently incorrect. This problem is overcome with the new method which calculates adjusted sandface inflow rates directly.

Nitrogen cushion Drillstem Test: Measurements of downhole inflow rates during flow periods of drillstem tests where a nitrogen cushion is simultaneously being vented at surface. The current practice is to simply vent the nitrogen cushion without any measurements, which results in a wasteful total loss of valuable information.

Workover and completion. If a well that is being worked on has a positive pressure, the wellbore volume, gas rates, and fluid inflow can be determined. The calculations of the present invention can easily be done in the morning after the pressure in the well has had a chance to buildup overnight. If the test reveals lack of inflow then valuable time need not be wasted with unnecessary swabbing; and Surface casing vent tests: Regulatory regulations require that any surface casing blowdown or flow must be measured. The method of the present invention not only measures the flowrate but calculates the volume of gas contained in the annulus, The embodiments of the invention in which an exclusive property or privilege is claimed are defined as follows:

1. A method of determining the rate of fluid flow into the wellbore of a well from a fluid-bearing reservoir, the wellbore forming a gas volume between a wellhead and the reservoir, there being a pressure differential between within and without the wellbore, and the wellhead having a port for fluid communication with the wellbore, the method comprising:

(a) blocking the port to prevent fluid flow therethrough and measuring pressure and change in pressure in the wellbore adjacent the wellhead over time;

(b) opening the port and measuring the flow of fluid therethrough, and measuring pressure and change in pressure in the wellbore over time, the duration of gas flow being insufficient to affect the reservoir;

(c) determining the original gas volume and an original rate of gas flow in the wellbore as a function of the change of pressure and gas volume assuming all of the fluid inflow from the reservoir is gas and the original gas volume remains constant throughout steps (a) and (b);

(d) flowing gas from the open port for a prolonged duration, while measuring the gas flow and measuring the pressure and the change in pressure in the wellbore over time, the duration of gas flow being sufficient to affect the reservoir;

(e) determining the total rate of fluid inflow to the wellbore from the reservoir as a function of the change in pressure in the wellbore, the rate of flow through the port, and the original gas volume assuming the original gas volume remains constant throughout step (d); and (f) determining the incremental inflow rate of fluid from the reservoir as the difference between the total rate of fluid inflow less the original rate of gas flow.

2. The method as recited in claim 1 wherein the incremental fluid inflow from the reservoir is only gas and therefore the incremental flow rate of fluid represents an incremental gas rate from the reservoir.

3. The method as recited in claim 2 wherein the total flow of gas for the wellbore $Q_{tot}$ is determined by the following relationship:

$$Q_{tot} = Q_{out} + KV \frac{dP}{dt}\bigg|_{open} \quad \text{and} \quad Q_{in} = \Delta Q + Q_{in}$$

where $\Delta Q$ is the incremental fluid inflow rate from the reservoir, $Q_{in}$ is the original rate of gas flow and V is the original gas volume, $Q_{out}$ is the measured rate of gas flow through the open port, K is a constant, and $$\frac{dP}{dt}\bigg|_{open}$$

is the rate of change of pressure in the wellbore measured when the port is open for a prolonged duration.

4. The method as recited in claim 1, wherein the fluid inflow from the reservoir is only liquid and is determined as the absolute value of the incremental change in gas volume for the wellbore over an increment of time, said incremental change in gas volume being a function of the measured flow of gas through the port, the change in pressure over time while the port is open, the original rate of gas flow, the original gas volume, and an average of the pressure over the increment of time.

5. The method as recited in claim 4 wherein the fluid flow for any time for the wellbore is only liquid and is determined as the absolute value of the incremental rate of change in gas volume dV for the wellbore over an increment of time dt using the relationship $$\frac{dV}{dt} = -\left(\frac{Q_{in}}{K\overline{P}} - \frac{Q_{out}}{K\overline{P}} - \frac{(V + \sum dV)}{P} \frac{dP}{dt}\right)$$

where $Q_{in}$ is the original rate of gas flow and V is the original gas volume, $Q_{out}$ is the measured rate of gas flow through the open port, K is a constant, $dP/dt$ is the rate of change of pressure in the wellbore measured when the port is open and gas continues to flow, $\overline{P}$ is the average pressure for the increment in time dt, and P is the instantaneous pressure.

6. The method as recited in claim 1, wherein the fluid inflow from the reservoir is both gas and liquid, further comprising:

blocking the port after the prolonged flow;

determining a final gas volume in the wellbore after the prolonged duration;

determining the rate of liquid inflow as the difference between the original gas volume and the final gas volume as a function of time over the prolonged duration;

determining the rate of gas inflow as the difference of the total fluid inflow rate and the liquid inflow rate.

7. The method as recited in claim 6, wherein the final gas volume in the wellbore after the prolonged duration is determined by repeating steps (a)–(c) after the prolonged duration to determine a new original gas volume which represents the final gas volume.

8. The method as recited in claim 1 wherein the original gas volume and original rate of gas flow is determined by establishing a first relationship of the rate of gas flow as a function of the unknown gas volume and the measured change in pressure in the wellbore adjacent the wellhead when the port is closed;

establishing a second relationship of the rate of gas flow as a function of the unknown gas volume, the measured flow of gas at the port, and the measured change in pressure in the wellbore adjacent the wellhead when the port is open; and simultaneously solving the first and second relationships for gas volume and original rate of gas flow.

9. The method as recited in claim 8 wherein the first relationship is linear and the second relationship is exponential.

10. The method as recited in claim 9 wherein the first relationship is $$Q_{in} = KV \frac{dP}{dt}\bigg|_{closed};$$

and the second relationship is $$Q_{in} - Q_{out} = KV_o \frac{dP}{dt}\bigg|_{open}$$

where $Q_{out} = PC$, and where K and C are constants $$\frac{dP}{dt}\bigg|_{closed} \quad \text{and} \quad \frac{dP}{dt}\bigg|_{open}$$

are rates of change of pressure measured in the wellbore when the port is closed and open respectively, $Q_{in}$ is the original rate of gas flow when the port was closed, $Q_{out}$ is the measured rate of gas flow through the open port, and V is the original gas volume.

11. The method as recited in claim 10 further comprising:

integrating the second relationship with respect to time between $t_1$ and $t_2$;

substituting the first relationship for $Q_{in}$ into the integrated second relationship to yield a third relationship $$C(t_2 - t_1) = -KV \ln\left(\frac{CP_2 - KV \frac{dP}{dt}\big|_{closed}}{CP_1 - KV \frac{dP}{dt}\big|_{closed}}\right);$$

selecting a first pair of pressure values measured as a function of time for the step where the port was closed for determining $$\frac{dP}{dt}_{closed};$$

selecting a second pair of pressure values measured as a function of time for the step where the port was open, said second pair of values being pressure $P_1$ at time $t_1$ and pressure $P_2$ at time $t_2$;

solving the third relationship for the original gas volume V knowing $$\frac{dP}{dt}_{closed},$$

$P_1,t_1$ and $P_2,t_2$; and solving for the original rate of gas flow $Q_{in}$.

12. The method as recited in claim 11 wherein a theoretical reservoir pressure response curve is created comprising:

rearranging the third relationship to form a fourth relationship $$P_2 = (CP_1 - Q_{in})e^{\frac{-C(t_2-t_1)}{KV}} + \frac{Q_{in}}{C}; \text{ and}$$

iteratively creating a curve of $P_2$ over time representing the theoretical reservoir pressure response if there is no incremental inflow of fluid from the reservoir.

13. The method as recited in claim 12 wherein a qualitative analysis of the inflow rate from the reservoir is obtained by:

creating an actual pressure response curve resulting from the measured pressure and rate of change of pressure in the wellbore over time while flowing gas from the open port for the prolonged duration; and comparing the theoretical and actual pressure response curves, any deviation between the theoretical and the actual pressure response curves representing fluid inflow from the reservoir.

14. The method as recited in claim 13 further comprising:

plotting the theoretical pressure response curve and the actual pressure response curves on a computer display.

15. The method as recited in claim 14 further comprising:

creating a curve representing the total fluid flow from the reservoir; and displaying the total fluid flow curve with the theoretical and actual pressure response curves on the computer display.

* * * * *